Sept. 21, 1971   W. H. RIGHTER   3,606,686
ANGULAR DEVIATION GAUGE
Filed July 22, 1969

INVENTOR
WALTER H. RIGHTER

Jack A Kang
ATTORNEY

United States Patent Office

3,606,686
Patented Sept. 21, 1971

3,606,686
ANGULAR DEVIATION GAUGE
Walter H. Righter, 12912 Malena Drive,
Santa Ana, Calif. 92705
Filed July 22, 1969, Ser. No. 843,292
Int. Cl. G01b 5/20, 5/24
U.S. Cl. 33—174
10 Claims

ABSTRACT OF THE DISCLOSURE

Disclosed is a measuring device for determining the angular relation between fixed surfaces. The device includes a base and a shell-like member pivotally mounted thereon. Measuring means mounted on the base determines the movement of the pivoting member with respect to the base to determine the angular relationship of the workpiece surfaces contacted by the faces of the measuring device.

---

This invention relates to measuring instruments, and particularly to instruments for precisely measuring minute variations of angularly disposed faces from a predetermined angular relationship.

In the production of machine parts such as tools, dies, jigs and the like, the angular relationship between certain surfaces in the finished product is often highly critical. Therefore it is often essential that the deviation from the desired end product be readily and easily ascertained at any point during the production of the part.

Many conventional measuring devices, such as fixed squares and the like, have been used with varying degrees of effectiveness for making such determinations. However, no conventional measuring device has heretofore been developed which may be used by the workman to readily determine angular deviations from the desired condition in the workpiece during the fabrication stage which does not require elaborate and time consuming calibration. It is therefore an object of this invention to provide a simple, inexpensive, and precise measuring gauge which may be used to accurately and easily measure angular relations between fixed surfaces and to indicate the deviation from the desired condition during any stage of fabrication.

Briefly, the present invention comprises a shell-like device having a pair of oppositely disposed faces. The shell-like device is pivotally mounted upon a base pedestal adapted to engage one surface of the workpiece. A measuring means mounted on the pedestal coacts with the pivotally mounted shell to measure the movement of the shell with respect to the pedestal when one face of the pivotally mounted shell is placed adjacent one surface of the workpiece and the base of the pedestal is placed adjacent another surface. The relationship between the two fixed surfaces is noted as an arbitrary point on the measuring means and the measuring device then rotated. When the above procedure is repeated the difference in the readings on the measuring instrument is proportional to the angular deviation of the fixed surfaces from the desired angular relationship.

A unique feature of the measuring device of this invention is the elimination of the necessity of calibrating the device prior to making the desired measurement. Since two measurements are made using opposite sides of a pivoting shell which has opposing faces in fixed angular relation with each other, the difference in the two measurements is directly proportional to the deviation of the angular relationship of the fixed surfaces from the desired condition and thus the exact deviation can be determined by dividing the measured deviation in half. Other objects, features and advantages of the invention will become more readily understood from the following detailed description taken in connection with the appended claims and attached drawing in which:

Figure 1:
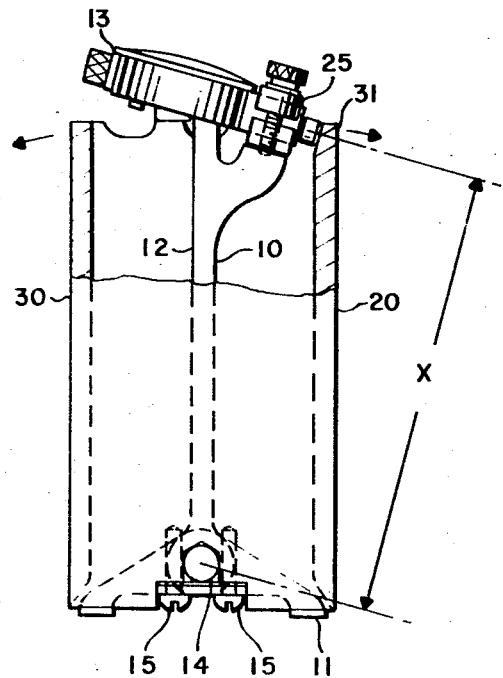
FIG. 1 is a pictorial view of one side of the device of the invention with portions of the pivotally mounted shell broken away.
Figure 2:
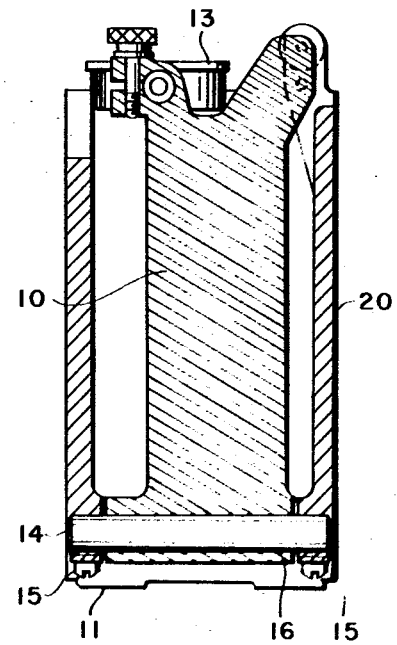
FIG. 2 is a sectional view of the device taken through the lines 2—2 of FIG. 3.
Figure 3:
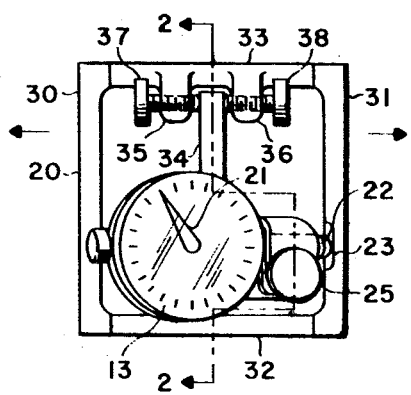
FIG. 3 is a top plan view of the device.

Referring now to FIG. 1, the major components of the measuring device of the invention are illustrated. The major components comprise a base pedestal 10 and a shell portion 20 pivotally mounted on the base portion. The base pedestal 10 has a flat base face 11 and a supporting arm 12 extending centrally through the device and substantially normal to flat surface 11. Measuring means 13 is mounted on the end of supporting arm 12 opposite the flat surface 11. A pivoting pin 14 is journaled in the pedestal 10 near the flat surface 11 in a plane substantially parallel with flat surface 11.

In the preferred embodiment pivot pin 14 is secured to opposite sides of the shell-like member 20 by conventional means such as screws 15 or the like. Pivoting pin 14 passes through an aperture 16 near the base of pedestal 10 whereby shell-like member 20 may pivot in the direction shown by arrows in FIG. 1.

Measuring means 13 may be any suitable device for measuring movement of the shell 20 such as a calibrated dial. Indicator 21, therefore, moves to indicate the movement of shell 20 with respect to the base pedestal 10 through the coaction of tongue 22 which is adapted to engage the bearing surface 23 in one side of the shell-like member 20. Measuring means 13 may be secured to the top of support arm 20 by any suitable means such as clamp 25 secured to support arm 12.

In the preferred embodiment shell-like member 20 includes a pair of coplanar opposed faces 30 and 31 adjoined by interconnecting sides 32 and 33. Support member 12 carries a flange 34 which projects laterally therefrom in a direction substantially parallel to opposed coplanar faces 30 and 31. Flange 34 is disposed between flange-like bosses 35 and 36 attached to interconnecting side 33 of the shell. A pair of adjusting screws 37 and 38 are threadedly mounted in bosses 35 and 36, respectively, to adjustably limit the movement of shell member 20 with respect to pedestal 10.

In the embodiment illustrated, opposed faces 30 and 31 are coplanar and shell-like member 20 is pivotally mounted on pedestal 12 such that coplanar faces 30 and 31 may be moved in the direction indicated by the arrows. In the embodiment shown faces 30 and 31 may be moved with relation to the flat surface 11 of the pedestal 12 so that the parallel surfaces 30 and 31 may be moved through an arc which includes a relation of 90° between faces 11 and 31 (and between faces 11 and 30).

The apparatus described may be made of any suitable material such as steel, cast iron or the like; the only essential requirements are that faces 11, 30 and 31 be substantially flat.

In the preferred embodiment the distance between the center of pivot pin 14 and the point where tongue 22 contacts the back of face 31 (as indicated by the distance labeled X is FIG. 1) is precisely known. Dimensions of the device may vary according to design and intended use. Apparatus measuring 4¼ inches by 4¼ inches by 6 inches wherein the distance X is 5 inches has been found to be suitable for most general applications.

Operation of the device described is extremely simple. For example, if one is producing a machine tool or the like which has two flat surfaces which are to intersect at an angle of 90°, the precise deviation from the required angular condition may be readily and accurately determined utilizing the device described. The operator simply places the base face 11 adjacent one of the surfaces on the workpiece and urges face 31 adjacent the other surface on the workpiece. When base face 11 is parallel to one surface of the workpiece, the angular relation between faces 11 and 31 will be substantially identical to the angular relation between the corresponding surfaces of the workpiece. The operator then either notes the reading on the measuring means 13 or sets the indicator 21 thereon to zero. The device is then rotated so that base face 11 remains adjacent the first surface of the workpiece and face 30 is urged adjacent the other workpiece surface. It will be observed that in this condition base face 11 remains parallel to one surface of the workpiece and the relation between base face 11 and face 30 now duplicates the angular relation between the two angularly disposed surfaces on the workpiece. However, if the angular relation between the two surfaces on the workpiece deviates from 90°, such deviation will cause shell member 20 to pivot and the movement of shell 20 will be indicated by the change in position of indicator needle 21. Obviously if the angular relation between the two workpiece surfaces is 90° there will be no movement of indicator 21. However, if the angular relation between the two workpiece surfaces is not precisely 90°, the arc through which shell 20 moves will be equal to twice the arc of the deviation. The deviation from 90° can also be expressed in any desirable units per length of one of the workpiece surfaces. Since the distance between the pivot point and the point at which tongue 22 engages face 31 corresponds to an equivalent distance along the workpiece surface, and since faces 30 and 31 are parallel, the change in position of the shell 20 as recorded on the measuring dial is exactly twice the deviation in units of length corresponding to the distance between the pivot point and the point where tongue 22 engages the back of face 31 (as indicated by the distance labeled X in FIG. 1). Thus if distance X is five inches, the deviation recorded on measuring means 13 will be deviation in units per ten inches. It will be readily appreciated that the deviation measured by the device described may be expressed either in seconds of arc or fractions of an inch in a given length, or any other suitable units.

From the above description it will be observed that no calibration is needed to utilize the device. A first measurement is made and the reading on the indicator dial set to zero. When the second reading is made the exact deviation from the desired angular relation is displayed immediately on the dial. In a device such as that described wherein opposed faces 30 and 31 are exactly parallel and the distance indicated as X on FIG. 1 is five inches, the exact deviation from 90° can be measured with extreme accuracy. An indicator dial reading of 0.001 inch is equivalent to two seconds of arc The opposed sides 30 and 31 may be adjustably interconnected by sides 32 and 33 so that the angular relationship between the opposed sides 30 and 31 can be varied as desired. Alternatively, adjustable blades or wedges (not shown) may be attached to one or both sides 30 and 31 to vary the angular relationship between the opposed gauging sides.

As shown in the drawings, both opposed gauging faces 30 and 31 must be capable of engaging the same workpiece surface while the base face 11 engages the other workpiece surface. Accordingly, the gauging faces must be separated by a distance at least as great as the linear distance of base face 11.

It will be readily understood that while the device of this invention has been described with reference to apparatus for determining angular deviation from a desired angular relation of 90°, similar apparatus may be readily produced to measure deviations from other angular relations. For example, if the two opposite sides of the shell part 20 are plane parallel, the device may be used to measure deviations from 90°. However, if face 30 is disposed at an angle of 2° from face 31, the device may be used in the manner described above to accurately measure the angular deviation from a desired angular relationship of 89°. Likewise, if the angle between the sides 30 and 31 of the shell member 20 is 90° the instrument may be used to measure angular deviations from a 45° angle. It will be readily understood that other relationships may be measured by appropriately positioning the sides 30 and 31 of the shell member 20 at various angular relations to each other.

It is to be understood that although the invention has been described with particular reference to specific embodiment thereof, the forms of the invention shown and described in detail are to be taken as the preferred embodiments of same and that various changes and modifications may be resorted to without departing from the spirit and scope of the invention.

What is claimed is:

1. A measuring device comprising:
   (a) a base member having a substantially flat base face,
   (b) a hollow pivoting member having two substantially flat gauging faces oppositely disposed thereon in fixed relation to each other and separated by a distance at least as long as said base face, said pivoting member being centrally mounted on said base member and adapted to pivot thereon,
   (c) means for measuring the movement of said pivoting member with respect to said base member, and
   (d) means for supporting said measuring means affixed to said base member and extending centrally through said pivoting member.

2. The device defined in claim 1 wherein said two substantially flat faces are substantially parallel.

3. The device defined in claim 1 wherein said pivoting member is adapted to pivot at least one of said two substantially flat gauging faces through an arc which will position at least one of said faces in a plane which intersects the plane of said base face at an angle of 90°.

4. The device defined in claim 1 including:
   (a) side means interconnecting said two substantially flat gauging faces,
   (b) a pair of spaced flanges extending from said side means generally toward said supporting means, and
   (c) means extending from said supporting means generally toward said side means and adapted to engage one of said spaced flanges when said pivoting means is moved with respect to said base member.

5. The device defined in claim 1 wherein said means for measuring the movement of said pivoting member is mounted on said supporting means and includes movable tongue means adapted to engage the back surface of one of said two substantially flat gauging faces.

6. A gauge for measuring the deviation of two surfaces from a predetermined angular relationship comprising:
   (a) a base member having a substantially flat base face,
   (b) a hollow pivoting member having two substantially flat opposite sides, said substantially flat opposite sides being maintained in a permanently fixed relationship with each other by a pair of interconnecting sides and spaced apart by a distance at least as great as the length of said base face,
   (c) gauge support means extending through the hollow space between said opposite sides.
   (d) means journaled in said base member for pivotally mounting said pivoting member on said base member to pivot thereabout, whereby said two substantially flat surfaces may be positioned in planes which are substantially equidistant from a plane which passes through the pivot axis and which intersects the plane of said substantially flat base plate at an angle of 90°, and (e) means for measuring the movement of said pivoting member with respect to said base member.

7. The gauge defined in claim 6 wherein said means for measuring the movement of said pivoting member with respect to said base member is mounted on said base member and includes moveable tongue means adapted to engage the back surface of one of said two substantially flat opposite sides.

8. A gauge for measuring the deviation of two surfaces from a predetermined angular relationship comprising:
   (a) a base member having a substantially flat base surface,
   (b) a hollow pivoting member having two substantially flat opposite gauging sides, said substantially flat opposite gauging sides being maintained in a fixed relationship with each other and separated by a distance at least as great as the length of said base face,
   (c) gauge support means extending through the hollow space between said oposite sides.
   (d) means journaled in said base member for mounting said pivoting member on said base member to pivot thereabout, whereby a plan substantially midway between said substantially flat opposite gauging sides will intersect said substantially flat base plate at an angle of 90°, and
   (e) means for measuring the movement of said pivoting member with respect to said base member.

9. The gauge defined in claim 8 wherein said means for measuring the movement of said pivoting member with respect to said base member is mounted on said base member and includes moveable tongue means adapted to engage the pivoting member.

10. The gauge defined in claim 8 wherein the angular relationship of said substantially flat opposite sides may be adjustably varied.

References Cited

UNITED STATES PATENTS 2,397,280   3/1946   Leszak _____ 33—112

LEONARD FORMAN, Primary Examiner

P. G. FOLDES, Assistant Examiner

U.S. Cl. X.R.

33—174Q, 174M